(12) United States Patent
Marsilio

(10) Patent No.: US 7,055,202 B2
(45) Date of Patent: Jun. 6, 2006

(54) TIRE ROTATING MACHINE

(75) Inventor: Michael Joseph Marsilio, Rocky River, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/160,189

(22) Filed: Jun. 13, 2005

(65) Prior Publication Data

US 2005/0217041 A1   Oct. 6, 2005

Related U.S. Application Data

(62) Division of application No. 10/250,218, filed on Jun. 13, 2003.

(51) Int. Cl.
*B60S 3/00*   (2006.01)
(52) U.S. Cl. ............... 15/53.4; 15/97.3; 15/88.2; 15/DIG. 2
(58) Field of Classification Search ............. 15/53.4, 15/88.1–88.4, 104.002, 256.5, DIG. 2, 97.2–97.3; 492/28
See application file for complete search history.

(56) References Cited

U.S. PATENT DOCUMENTS

| | | | |
|---|---|---|---|
| 2,401,842 A | 6/1946 | Slater | 15/104.002 |
| 3,158,887 A | 12/1964 | Kanbar et al. | 15/104.002 |
| 3,622,412 A | 11/1971 | Ross et al. | 156/87 |
| 3,646,651 A | 3/1972 | McGaughey et al. | 29/130 |
| 4,233,703 A * | 11/1980 | Clyne et al. | 15/53.4 |
| 5,388,300 A | 2/1995 | Hickey | 15/104.002 |
| 5,826,511 A | 10/1998 | Schmitt | 101/425 |
| 6,068,100 A | 5/2000 | Thomas | 193/37 |
| 6,336,543 B1 | 1/2002 | Thomas | 193/37 |
| 6,409,645 B1 | 6/2002 | Paasonen et al. | 492/56 |
| 6,435,244 B1 | 8/2002 | Shieh et al. | 156/425 |
| 6,471,627 B1 | 10/2002 | Chapman et al. | 492/56 |
| 6,514,369 B1 | 2/2003 | Shieh | 156/154 |
| 6,671,917 B1 | 1/2004 | Nishina | 15/53.4 |
| 2004/0250361 A1* | 12/2004 | Marsilio | 15/3 |

FOREIGN PATENT DOCUMENTS

| | | | |
|---|---|---|---|
| DE | 37 08 606 A1 * | 9/1988 | |
| JP | 58-30855 * | 2/1983 | |
| JP | 58-30856 * | 2/1983 | |

OTHER PUBLICATIONS

English Translation of DE 37 08 606 A1, Sep. 29, 1988.*

* cited by examiner

*Primary Examiner*—Richard Crispino
*Assistant Examiner*—Laura C Guidotti
(74) *Attorney, Agent, or Firm*—Raymond L. Coppiellie; Brooks & Kushman, P.C.

(57) ABSTRACT

A machine for rotating a tire disposed on a vehicle. The machine includes a roller and a roller cover. Contaminants on a tire may be captured by the roller cover and disposed of when the roller cover is periodically removed from the roller.

12 Claims, 2 Drawing Sheets

TIRE ROTATING MACHINE

CROSS-REFERENCE TO RELATED APPLICATIONS

This application is a division of U.S. application Ser. No. 10/250,218 filed Jun. 13, 2003, now abandoned, and is hereby incorporated by reference in its entirety.

BACKGROUND OF THE INVENTION

1. Field of the Invention

The present invention relates to a roller assembly for a machine that rotates a tire disposed on a vehicle and a method of making a roller assembly.

2. Background Art

Rollers are used on vehicle testing and steering alignment equipment such as dynamometers, vehicle roll testers, and toe-set alignment machines. A vehicle is positioned on such equipment so that its tires contact one or more rollers. Friction, heat, and pressure transfer contaminants from the tire to the roller when a tire rotates. These contaminants can include oil, steering fluid, dirt, tire dust, and other particulates. Contaminants accumulate on the outer surface of the roller and can interfere with equipment accuracy and performance. For example, in the case of a toe-set alignment machine accumulated contaminants on the surface of a roller can cause a tire to tilt. Tilting of the tire can result in inaccurate measurements and improper adjustments when attempting to correct misalignment conditions and associated warranty claims.

Manual cleaning operations are employed to remove contaminants from rollers as a regular maintenance item. Operators scrape the surface of the roller with paint scrappers and also may use chemical solvents to remove contaminants. Scraping is labor intensive and the use of chemical solvents is generally sought to be avoided in industrial facilities if possible.

Contaminants dislodged from the surface of the roller can infiltrate other components such as roller bearings, motors, and gear boxes. These loose contaminants can degrade equipment performance and increase wear, breakdowns, and associated maintenance expenditures. In addition, loose contaminants can accumulate underneath and between rollers, which impairs rotation of the roller and allows contaminants to redeposit on the surface of the roller.

The present invention is directed to providing a solution to one or more of these problems and others as summarized below.

SUMMARY OF THE INVENTION

In at least one embodiment of the present invention, a machine for rotating a tire disposed on a motor vehicle is provided. The machine includes a roller and a roller cover. The roller has an outer surface and is rotatably mounted along an axis. The roller cover is removably attached to the roller. Rotation of the roller allows contaminants on the tire to be captured by the roller cover and disposed of when the roller cover is periodically removed from the roller.

In at least one other embodiment, a machine for rotating a tire disposed on a motor vehicle is provided. The machine includes a supporting structure and a roller assembly rotatably attached to a supporting structure. The roller assembly includes a roller and a roller cover. The roller is rotatably mounted along an axis and has an outer surface. The roller cover is removably attached to at least a portion of the outer surface such that the roller cover does not move relative to the roller. The roller cover includes a first surface disposed adjacent to the outer surface and a second surface disposed opposite the first surface. Contaminants are transferred from the tire to the second surface when the second surface contacts the tire and wherein contaminants are disposed of by removing the roller cover from the roller.

DETAILED DESCRIPTION

Figure 1:
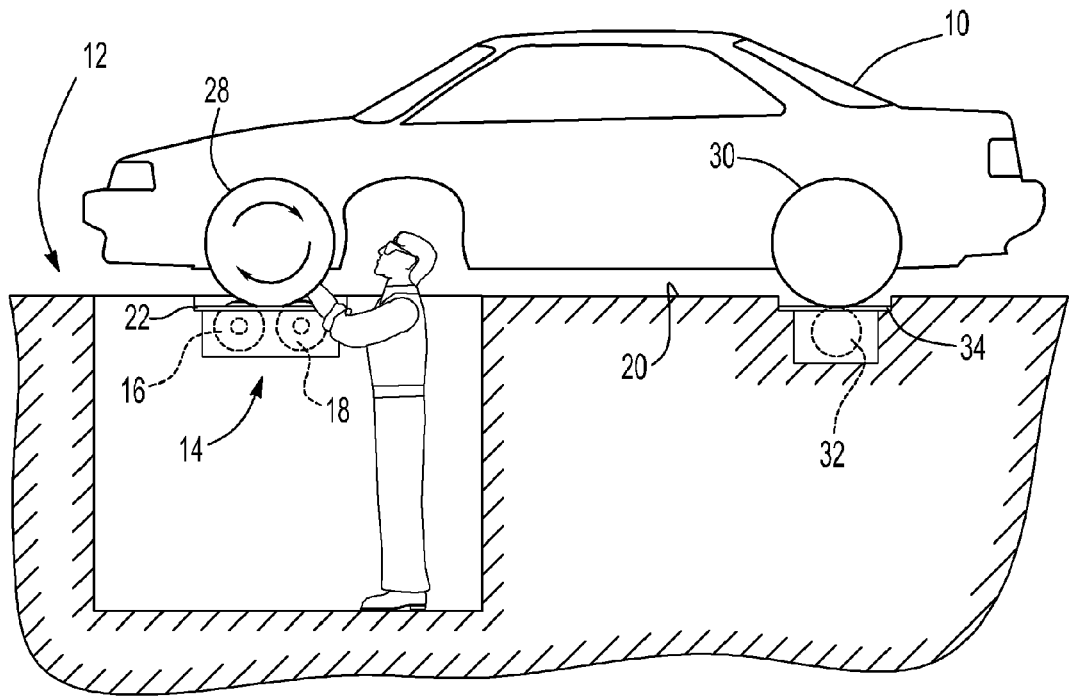
FIG. 1 is a perspective view of a vehicle on an alignment machine having a roller assembly made in accordance with the present invention.

Referring to FIG. 1, a vehicle 10 is shown on a machine that rotates a tire. More specifically, the embodiment shown in FIG. 1 may be a wheel alignment machine 12. Alternatively, the machine could be a dynamometer, vehicle roll tester, or steering alignment fixture.

Figure 2:
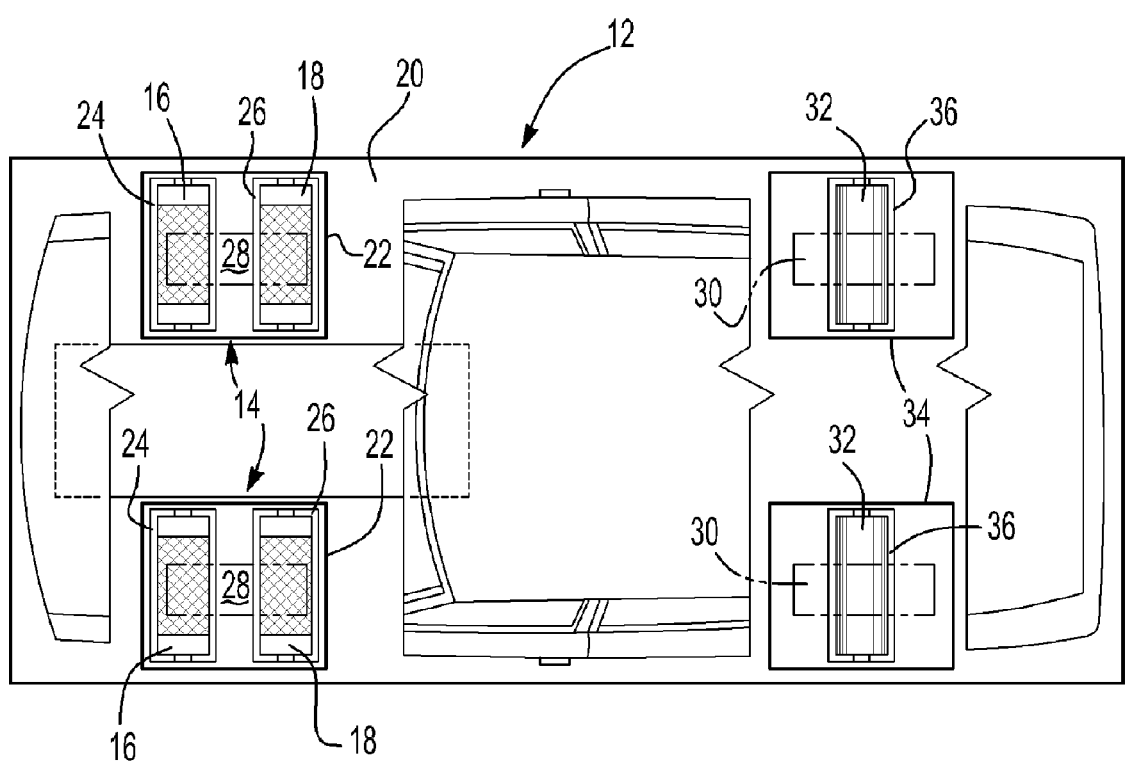
FIG. 2 is a plan view of an alignment machine having a plurality of roller assemblies of the present invention.

Referring to FIGS. 1 and 2, the alignment machine 12 includes a plurality of roller sets 14. Each roller set 14 includes a first roller assembly 16 and a second roller assembly 18 positioned parallel and spaced from each other. The first roller assembly 16 and second roller assembly 18 may have the same construction and are rotatably attached to a supporting structure located beneath a floor 20 of the alignment machine 12. A slotted plate 22 may be located adjacent to each roller set 14 and includes a first slot 24 providing access to the first roller assembly 16 and a second slot 26 providing access to the second roller assembly 18.

In a wheel alignment machine, the slotted plate 22 may be movable in a vertical direction. Initially, the slotted plate 22 is positioned parallel to and flush with the floor 20 so that the first roller assembly 16 and the second roller assembly 18 do not protrude through the first and second slots, 24 and 26, respectively. The vehicle 10 can then be rolled into position on the alignment machine 12 without touching the first or second roller assemblies 16, 18. The vehicle 10 may be positioned on the alignment machine 12 such that each front tire 28 is located above a roller set 14. The slotted plates 22 are then lowered to allow the first roller assembly 16 and the second roller assembly 18 to partially protrude through the first and second slots, 24 and 26, respectively, to contact a front tire 28.

Similarly, each rear tire 30 of the vehicle 10 may be located above a rear roller 32. A rear slotted plate 34 is lowered to allow the rear roller 32 to partially protrude through a slot 36 in the rear slotted plate 34 and contact a rear tire 30. Slotted plates 22 and 34 may be raised to allow the vehicle to be rolled off the alignment machine 12 after any necessary measurements and/or adjustments are made.

Figure 3:
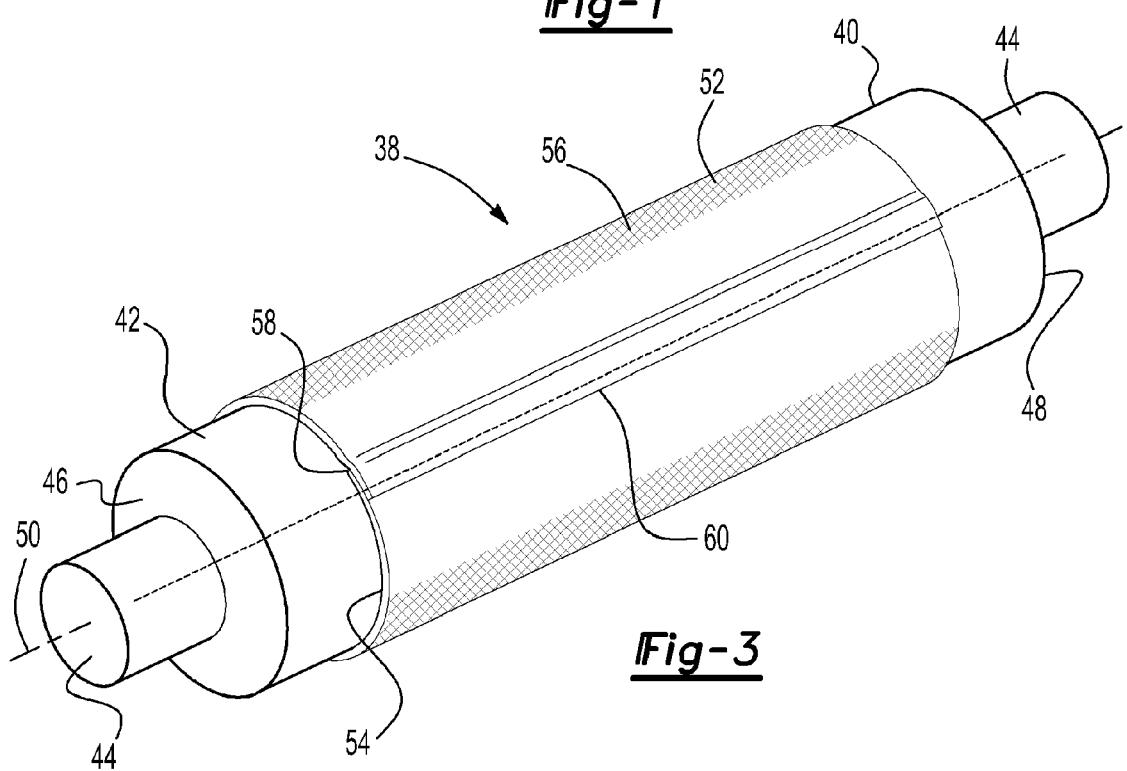
FIG. 3 is a perspective view of a roller assembly having an overlapping roller cover made in accordance with one embodiment of the present invention.

Referring to FIG. 3, a perspective view of a roller assembly 38 is shown in more detail. The roller assembly 38 includes a cylindrical roller 40 having a generally smooth outer surface 42. Mounting pins 44 are located at a first end 46 and a second end 48 of the roller 40 along a transverse axis 50. The mounting pins 44 rotatably support the roller 40 and allow the roller to rotate about the transverse axis 50.

A cover 52 has a first surface 54 and a second surface 56 opposite the first surface 54. In one embodiment, the cover 52 is a sheet of Fasson® 2 Mil White Polyester with a pressure sensitive self-adhesive backing. The first surface 54 of the cover 52 contacts the outer surface 42 along the circumference of the roller 40. The cover 52 is disposed on a portion of the outer surface 42 between the first end 46 and the second end 48 of the roller 40. Alternatively, the cover 52 may extend completely across the roller from the first end 46 to the second end 48 of the roller 40.

The cover 52 has a first edge 58 and a second edge 60. The first edge 58 may be positioned near the second edge 60 after the cover 52 is wrapped around the roller 40. In one embodiment, the first edge 58 is positioned between the outer surface 42 of the roller 40 and the first surface 54 of the cover 52 so that the first edge 58 overlaps the second edge 60 as depicted in FIG. 3.

The first edge 58 and the second edge 60 may be parallel to each other. Alternatively, the first edge 58 and the second edge 60 may be provided such that they are not parallel to each other. For example, the first edge 58 may be straight and the second edge 60 may have a curved, sawtooth, or wave-like pattern that is not parallel to the first edge 58. The edges may also be aligned so that they extend perpendicular to the ends or may be askew.

Referring back to FIGS. 1 and 2, the cover 52 may be provided on the first and second roller assemblies, 16 and 18. Alternatively, one of the covers 52 may be provided on any or all of the first roller assembly 16, the second roller assembly 18, or the rear roller 32.

A method making a roller assembly 38 will now be described. First, contaminants are removed from the outer surface 42 of the roller 40 to reveal a clean, smooth surface of the roller. To install the cover 52, the first surface 54 of the cover 52 is placed against the outer surface 42 of the roller 40. In one embodiment, the first surface of the cover 52 is placed in contact with the outer surface 42 of the roller 40 starting at the first edge 58.

An adhesive is provided between the outer surface 42 of the roller and the first surface 54 of the cover. The adhesive may be placed on the first surface 54 or on the outer surface 42 of the roller 40. Moreover, the adhesive may be provided on all or a portion of the first surface 54 or the outer surface 42. The adhesive may be pre-applied to the cover 40 as a pressure sensitive adhesive layer or may be manually applied as part of the process.

Next, the roller 40 is rotated to permit the cover 52 to wrap around the outer surface 42. The cover 52 may be pressed to secure the cover in place as the roller 40 is rotated.

After the cover 52 is attached to the roller, contaminants may adhere to the second surface 56 of the cover 52. When the cover 52 captures sufficient contaminants it may be replaced. The replacement operation includes peeling the cover 52 away from the outer surface 42 of the roller 40, removing any residual adhesive on the outer surface 42, and installing a new cover 52 as previously described.

While the best mode for carrying out the invention has been described in detail, those familiar with the art to which this invention relates will recognize various alternative designs and embodiments for practicing the invention as defined by the following claims.

What is claimed is:

1. A machine for rotating a tire disposed on a motor vehicle, the machine comprising:
    a supporting structure; and
    a roller assembly rotatably attached to the supporting structure, the roller assembly including:
        a roller rotatably mounted along an axis and having an outer surface; and
        a roller cover removably attached to at least a portion of the outer surface such that the roller cover does not move relative to the roller, the roller cover including a first surface disposed adjacent to the outer surface and a second surface disposed opposite the first surface;
    wherein the supporting structure and the roller assembly cooperate to support the tire and wherein contaminants are transferred from the tire to the second surface when the second surface contacts the tire and wherein contaminants are disposed of by removing the roller cover from the roller.

2. The machine of claim 1 further comprising a slotted plate disposed adjacent to the roller assembly.

3. The machine of claim 2 wherein the slotted plate is moveable generally perpendicular to an axis of rotation of the roller assembly.

4. The machine of claim 1 further comprising first and second roller assemblies positioned generally parallel to and spaced apart from each other, the first and second roller assemblies configured to engage the tire.

5. The machine of claim 4 wherein the first and second roller assemblies have first and second roller covers, respectively.

6. The machine of claim 4 further comprising a slotted plate having first and second slots spaced apart from each other, wherein at least a portion of the first and second roller assemblies extends through the first and second slots, respectively, to engage the tire when the slotted plate is in a lowered position.

7. The machine of claim 6 wherein the first and second roller assemblies do not extend through the first and second slots, respectively, to engage the tire when the slotted plate is in a raised position.

8. A machine for rotating a tire disposed on a motor vehicle, the machine comprising:
    a supporting structure; and
    a roller assembly rotatably attached to the supporting structure, the roller assembly including:
        a roller rotatably mounted along an axis and having an outer surface; and
        a roller cover for collecting contaminants from the tire, the roller cover being removably attached to at least a portion of the outer surface and including a first surface disposed adjacent to the outer surface and a second surface disposed opposite the first surface;
    wherein the roller cover inhibits contaminants from accumulating on the roller to inhibit the tire from tilting when the tire contacts the roller assembly.

9. The machine of claim 8 wherein the roller cover further comprises first and second edges disposed opposite each other, the first edge being disposed between and adjacent to the outer surface of the roller and a portion of the first surface disposed adjacent to the second edge when the roller cover is removably attached to the roller.

10. The machine of claim 8 wherein the machine is a dynamometer.

11. The machine of claim 8 wherein the machine is a wheel alignment machine.

12. The machine of claim 8 wherein the machine is a vehicle roll tester.

* * * * *